United States Patent
Sim et al.

(10) Patent No.: US 9,088,163 B2
(45) Date of Patent: Jul. 21, 2015

(54) SECONDARY BATTERY PACK

(75) Inventors: Se-Sub Sim, Yongin-si (KR); Susumu Segawa, Yongin-si (KR); Eui-Jeong Hwang, Yongin-si (KR); Jong-Woon Yang, Yongin-si (KR); Han-Seok Yun, Yongin-si (KR); Beom-Gyu Kim, Yongin-si (KR); Jin-Wan Kim, Yongin-si (KR)

(73) Assignee: Samsung SDI Co., Ltd., Gyunggi-Do (KR)

( * ) Notice: Subject to any disclaimer, the term of this patent is extended or adjusted under 35 U.S.C. 154(b) by 974 days.

(21) Appl. No.: 13/171,365

(22) Filed: Jun. 28, 2011

(65) Prior Publication Data

US 2012/0056586 A1 Mar. 8, 2012

Related U.S. Application Data

(60) Provisional application No. 61/381,006, filed on Sep. 8, 2010.

(51) Int. Cl.
*H02J 7/00* (2006.01)

(52) U.S. Cl.
CPC .............. *H02J 7/0016* (2013.01); *H02J 7/0042* (2013.01); *Y02T 10/7055* (2013.01)

(58) Field of Classification Search
USPC ........................................................ 320/118
See application file for complete search history.

(56) References Cited

U.S. PATENT DOCUMENTS

| | | | |
|---|---|---|---|
| 5,751,136 A | 5/1998 | Takechi et al. | |
| 5,910,723 A | 6/1999 | Perelle | |
| 2005/0175889 A1 | 8/2005 | Han | |
| 2006/0019160 A1 | 1/2006 | Han | |
| 2008/0129247 A1* | 6/2008 | Lee et al. | 320/134 |
| 2008/0309288 A1 | 12/2008 | Benckenstein et al. | |
| 2009/0179610 A1 | 7/2009 | Lin | |

FOREIGN PATENT DOCUMENTS

| | | |
|---|---|---|
| CN | 101088203 A | 12/2007 |
| CN | 201117742 Y | 9/2008 |
| CN | 101714675 A | 5/2010 |
| CN | 101764268 A | 6/2010 |
| EP | 0 693 814 A1 | 1/1996 |

(Continued)

OTHER PUBLICATIONS

Japanese Office Action dated May 7, 2013 for Japanese Patent Application No. JP 2011-193627 which claims priority from U.S. Appl. No. 61/381,006, filed Sep. 8, 2010; and captioned U.S. Appl. No. 13/171,365.

(Continued)

*Primary Examiner* — Edward Tso
*Assistant Examiner* — Robert Grant
(74) *Attorney, Agent, or Firm* — Knobbe Martens Olson & Bear LLP

(57) ABSTRACT

A secondary battery pack is described that is rechargeable and has a large capacity. The secondary pack has multiple battery units and at least one controller. Each battery unit of the battery pack includes a cell unit and a cell balancing system. In one embodiment, the cell balancing system has at least three detachable connections for connecting the cell balancing system to the cell unit, the controller or to other cell balancing units. The connections allow the cell balancing systems to be detached from the battery units and reused.

11 Claims, 3 Drawing Sheets

(56) References Cited

FOREIGN PATENT DOCUMENTS

| | | | |
|---|---|---|---|
| JP | 8-180905 | A | 7/1996 |
| JP | 2005-044603 | A | 2/2005 |
| JP | 2007-012584 | A | 1/2007 |
| JP | 2007-330069 | A | 12/2007 |
| JP | 2008-226744 | A | 9/2008 |
| JP | 2009-050085 | | 3/2009 |
| JP | 2009-050085 | A | 3/2009 |
| JP | 2010-038468 | A | 2/2012 |
| KR | 10-2005-0074197 | | 7/2005 |
| KR | 10-2005-0074197 | A | 7/2005 |
| KR | 10-2005-0123367 | | 12/2005 |
| KR | 10-2005-0123367 | A | 12/2005 |
| WO | WO 2008/095315 | A1 | 8/2008 |

OTHER PUBLICATIONS

Korean Notice of Allowance dated May 13, 2013 for Korean Patent Application No. KR 10-2011-0065953 which claims priority from U.S. Appl. No. 61/381,006, filed Sep. 8, 2010, and captioned U.S. Appl. No. 13/171,365. Cited references JP 08-180905 (A) and JP 2005-044603 (A) are previously disclosed in the IDS dated Nov. 21, 2012.

Korean Office Action dated Oct. 29, 2012 for Korean Patent Application No. KR 10-2011-0065953 which claims priority from U.S. Appl. No. 61/381,006, filed Sep. 2010, and captioned U.S. Appl. No. 13/171,365.

Japanese Office Action dated Feb. 12, 2014 for Japanese Patent Application No. JP 2011-193627 which claims priority from U.S. Appl. No. 61/381,006, filed Sep. 8, 2010, and captioned U.S. Appl. No. 13/171,365.

Chinese Office Action dated Dec. 4, 2013 for Chinese Patent Application No. CN 201110264585.4 which claims priority from U.S. Appl. No. 61/381,006, filed Sep. 8, 2010, and captioned U.S. Appl. No. 13/171,365.

Extended European Search Report dated Apr. 14, 2014 for European Patent Application No. EP 11 173 187.3 which claims priority from U.S. Appl. No. 61/381,006, filed Sep. 8, 2010, and captioned U.S. Appl. No. 13/171,365.

* cited by examiner

SECONDARY BATTERY PACK

CROSS-REFERENCE TO RELATED APPLICATIONS

This application claims the benefit of U.S. Provisional Application No. 61/381,006 filed on Sep. 8, 2010, the contents of which are incorporated herein by reference in their entirety.

BACKGROUND

1. Field

The technological field relates to a secondary battery pack, and more specifically, to a secondary battery pack that includes a removable cell balancing system to be reused.

2. Description of the Related Technology

Generally, a secondary battery can be recharged and formed in a small size and large capacity. With the development of the lightweight and high functional portable radio devices, such as a mobile phone, a PDA, or a notebook computer, developments have been made on the use of a secondary battery as a driving power supply for portable radio devices.

In particular, the capacity of the secondary battery should be large to be used for an electric car, a hybrid car, or the like.

In order to make the capacity of the secondary battery large, a pack of a multi cell, not a single cell, is used, such that a high voltage can be applied to the secondary battery and the capacity of the secondary battery can be increased. However, the voltage of each multi cell tends to be unbalanced with the passage of time since the cell itself has charge and discharge characteristics.

The voltage difference between the cells in the secondary battery pack leads to unbalancing between the batteries, thereby resulting in the loss of the capacity of the secondary battery pack.

Therefore, various cell balancing systems and methods for balancing each cell have been developed so that all the cells of the secondary battery can be uniformly charged while preventing overcharging.

However, for cell balancing, to be performed, a cell balancing system should be attached to the secondary battery. In this case, the manufacturing cost of the secondary battery increases. Therefore, there is a problem in that the cost of the secondary battery is increased.

SUMMARY OF CERTAIN INVENTIVE ASPECTS

One aspect is a battery pack including at least one battery unit and a controller for controlling the operation of the at least one battery unit. The at least one battery unit includes a cell unit comprising a plurality of cells, and a cell balancing system for balancing the voltage among the plurality of cells. The cell balancing system is configured to be detachable from the at least one battery unit.

Another aspect is a battery unit including a cell unit comprising a plurality of cells, and at least one cell balancing system for balancing the voltage among the plurality of cells. The cell balancing system is configured to be detachable from the battery unit.

Another aspect is a cell balancing system for balancing voltage among a plurality of cells in a multi-cell unit within a battery pack. The cell balancing system including a first connector for connecting the cell balancing system to a multi-cell unit of a first battery unit, a second connector for connecting the cell balancing system to at least one of a controller or a second battery unit, and a third connector for connecting the cell balancing system to a third battery unit or to a controller, wherein the first, second and third connectors are configured to allow the cell balancing system to be detached from the battery pack.

BRIEF DESCRIPTION OF THE DRAWINGS

The accompanying drawings, together with the specification illustrate exemplary embodiments, and, together with the description, serve to explain the principles of the various embodiments.

DETAILED DESCRIPTION OF CERTAIN INVENTIVE EMBODIMENTS

Hereinafter, some embodiments of the present invention will be described with reference to the accompanying drawings. However, the various embodiments may be embodied in different ways and should not be construed as limiting the invention to the exemplary embodiments set forth herein. Rather, these embodiments are provided so that this disclosure will be thorough and complete.

Figure 1:
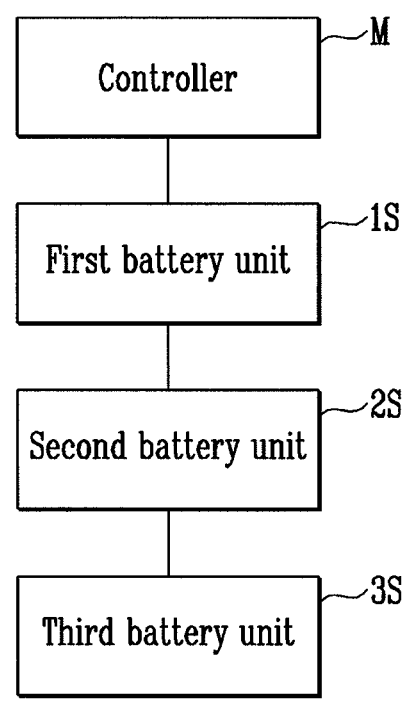
FIG. 1 is a diagram illustrating a structure of a secondary battery pack according to some embodiments.

FIG. 1 is a diagram illustrating a structure of a secondary battery pack according to some embodiments.

Referring to FIG. 1, a secondary battery pack includes a controller M, a first battery unit 1S, a second battery unit 2S, and a third battery unit 3S.

The controller M receives information, such as temperature, voltage, current, or the like, from the first to third battery units 1S to 3S to determine the state of each battery unit 1S to 3S. The cell balancing is achieved according to the received information. The cell balancing is achieved by determining a battery unit, requiring cell balancing, among the first to third battery units 1S to 3S and then transmitting a cell balancing instruction to the first to third battery units 1S to 3S. Herein, the controller M is connected to the first battery unit 1S but may be connected to the third battery unit 3S.

The first to third battery units 1S to 3S include a plurality of cells (not shown) and output a high voltage and a large amount of current. Further, each of the first to third battery units 1S to 3S further includes the cell balancing system (not shown) to achieve the cell balancing by the operation of the cell balancing system. In addition, the first to third battery units 1S to 3S and the cell balancing system can be easily detached and independently replaced.

Although it is shown that the first to third battery units 1S to 3S are connected to one controller M, the embodiment is not limited thereto. Therefore, the number of battery units connected to the controller M is variously configured.

Figure 2:
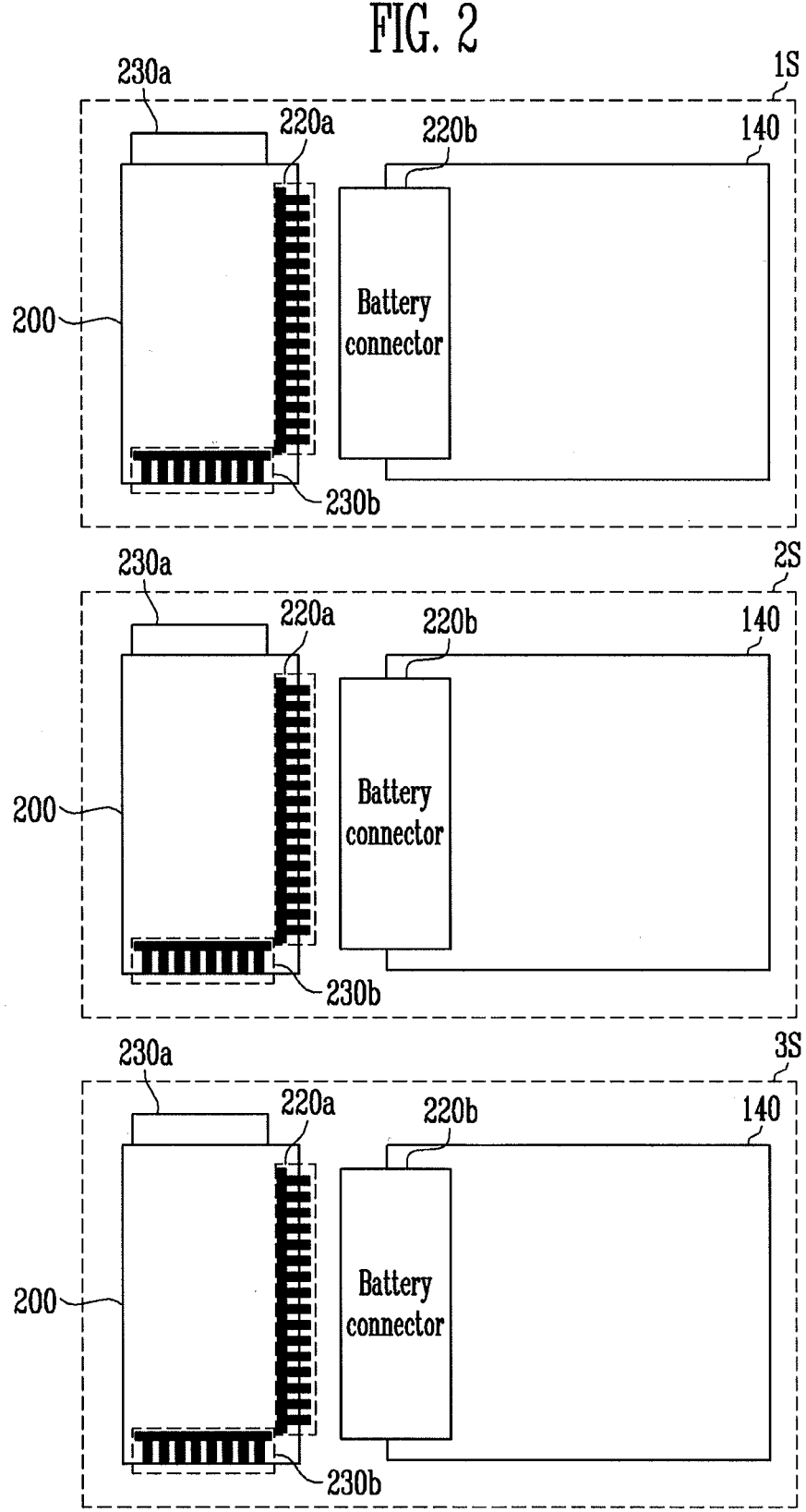
FIG. 2 is a diagram showing a connection relationship of battery units used for a secondary battery pack according to some embodiments.

FIG. 2 is a diagram showing a connection relation of battery units used for the secondary battery pack shown in FIG. 1. Each of the first to third battery units 1S to 3S is configured to include a cell unit 140 and a cell balancing system 200.

Each cell unit 140 includes a plurality of cells and a battery connector 220b that transfers current, voltage, temperature, or the like, to the outside from the plurality of cells.

Each cell balancing system 200 includes a first connector 220a, a second connector 230a, and a third connector 230b that receive and transmit signals from the outside.

In the cell balancing system 200 of the first battery unit 1S, the first connector 220a is connected to the battery connector 220b that is connected to the cell unit 140. The second connector 230a is connected to the controller M (not shown), and the third connector 230b is connected to the second connector 230a of the second battery unit 2S. In the cell balancing system 200 of the second battery unit 2S, the first connector 220a is connected to the battery connector 220b that is connected to the cell unit 140. The second connector 230a is connected to the third connector 230b of the first battery unit 1S, and the third connector 230b is connected to the second connector 230a of the third battery unit 3S. In the cell balancing system 200 of the third battery unit 3S, the first connector 220a is connected to the battery connector 220b that is connected to the cell unit 140. The second connector 230a is connected to the third connector 230b of the second battery unit 2S, and the third connector 230b remains in the disconnected state.

While an example connection is shown in FIG. 2, the number of battery units and cell balancing system is not limited thereto. Furthermore, each cell balancing system may be configured to be connected to a modular battery unit. A modular battery unit may be one of a battery unit, another cell balancing system, or a controller.

When each connector is connected, the cell balancing system 200 of the first battery unit 2S, the cell balancing system 200 of the second battery unit 2S, and the cell balancing unit 200 of the third battery unit 3S are electrically connected to each other. Therefore, each of a data line (data), a ground line (ground), a clock line (CLK), an anode line (+), and a cathode line (−) is connected to data lines (data), ground lines (ground), clock lines (CLK), anode lines (+), and cathode lines (−) of the second battery unit 2S and the third battery unit 3S. In addition, each connector 220a, 220b, 230a, and 230b is configured such that each element is easily detachable. Each connector 220a, 220b, 230a, and 230b may also be easily detachable such that the circuit components may be easily disconnected. Therefore, each cell balancing system 200 and cell unit 140 may be easily removed or detached. The cell balancing systems 200 and the cell units 140 of each battery unit 1S to 3S can be replaced independently. Therefore, only a specific cell balancing system 200 can be replaced or only a specific cell unit 140 can be replaced.

Each cell balancing unit 200 may be mateably connected to each battery unit 1s, 2s, and 3s. Each cell balancing unit may also be mateably connected to the controller M and to another cell balancing unit 200.

Figure 3:
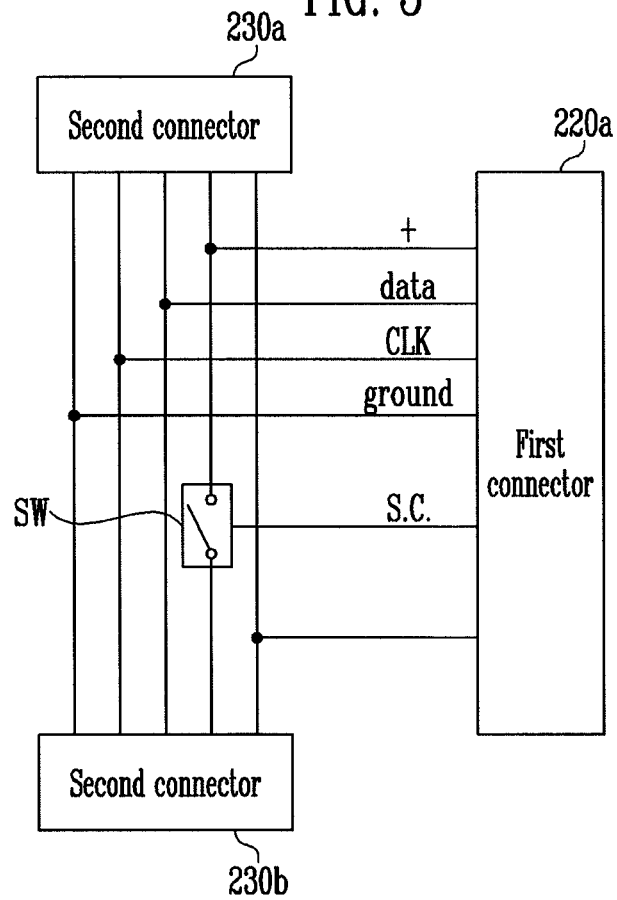
FIG. 3 is a diagram illustrating a circuit diagram of a cell balancing system shown in according to some embodiments.

FIG. 3 is a diagram illustrating a circuit diagram of the cell balancing system shown in FIG. 1. Referring to FIG. 3, the cell balancing system includes the first connector 220a, the second connector 230a, the third connector 230b, and a switch SW. An anode line (+) that transmits a positive potential voltage, a cathode line (−) that transmits a negative potential voltage, a data line (data) that transmits data such as current, voltage, temperature, or the linke, a ground line (ground) that is connected to a ground potential, a clock line (CLK) that transmits a clock, a switch control line (S.C.) that controls the switch SW connect the first connector 220a, the second connector 230a, and the third connector 230b.

The cell balancing system opens the anode line (+) when the switch SW is turned-off. At this time, the cell balancing operation is not performed. In this state, the first to third battery units 1S to 3S are either charged through the charging source or discharged by providing current to the external devices. The anode line (+) is short-circuited when the switch SW is turned-on. In this state, the cell unit 140 performs the cell balancing operation. The operation of the switch SW may be controlled by the controller M.

Figure 4:
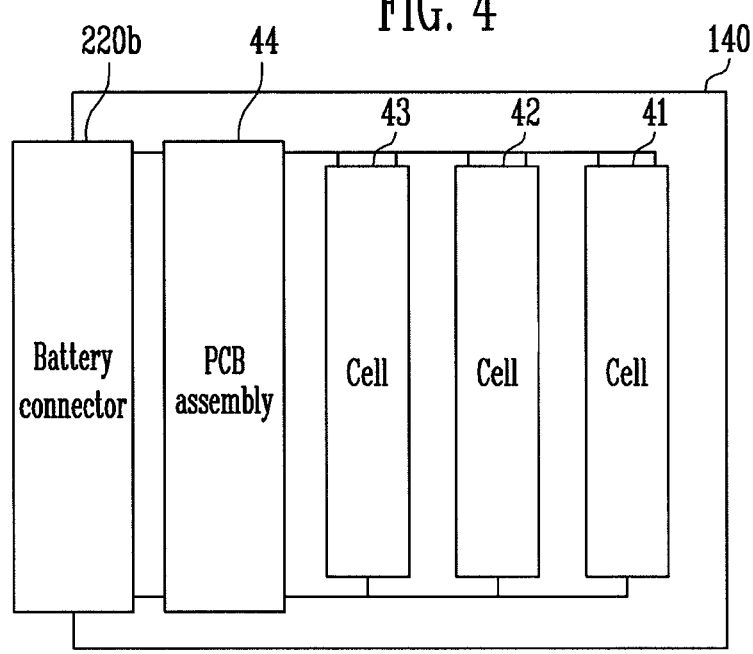
FIG. 4 is a diagram illustrating a structure of a cell unit of the secondary battery pack according to some embodiment.

FIG. 4 is a diagram illustrating a structure of a cell unit of the secondary battery pack according to an embodiment of the present invention. Referring to FIG. 4, the cell unit 140 includes a plurality of cells 41, 42, and 43 and a Printed Circuit Board (PCB) assembly 44 that transmits or receives signals from the plurality of cells 41, 42, and 43, and the battery connector 220b.

The plurality of cells 41, 42, and 43 are connected in parallel in order to increase the capacity of the battery unit 140.

The PCB assembly 44 is connected to the plurality of cells 41, 42, and 43 and receives information such as voltage, current, and temperature, or the like, of each cell. The PCB assembly 44 receives the information that is output from each cell 41, 42, and 43 and transmits it to controller M through the battery connector 230b. The battery connector 220b communicates with the controller M through the data line (data) that is connected thereto. In addition, when the PCB assembly 44 receives the cell balancing instruction from the controller M, the cell balancing is performed. While the PCB 44 is described herein as a printed circuit board, it is not limited thereto. The PCB may generally be described as a protective circuit module which is configured to communicate with each of the battery cells 41, 42, and 43.

The battery connector 220b communicates the cell balancing instruction signal to the PCB assembly 44 and receives the cell balancing instruction signal.

Although the exemplary embodiment of the present invention are described using specific terms, it is described by way of example only. It is to be construed that various changes and modifications can be implemented without departing from the technical spirit and scope of the following claims.

What is claimed is:

1. A battery pack comprising:
at least one battery unit; and
a controller for controlling the operation of the at least one battery unit, wherein the at least one battery unit comprises:
a cell unit comprising a plurality of cells; and
a cell balancing system for balancing the voltage among the plurality of cells, the cell balancing system comprising:
a first connector for connecting the cell balancing system to a cell unit of a first battery unit;
a second connector for connecting the cell balancing system to at least one of the controller or a second battery unit; and
a third connector for connecting the cell balancing system to a third battery unit or to the controller, wherein the first, second and third connectors are configured to allow the cell balancing system to be physically removable from the at least one battery unit.

2. The battery pack of claim 1, wherein the controller receives information regarding the state of the at least one battery unit and transmits a cell balancing instruction based on the information.

3. The battery pack of claim 2, wherein the information includes information regarding voltage, current, and temperature of each cell in the cell unit.

4. The battery pack of claim 1, wherein the cell balancing system is mateably connected to the battery unit.

5. The battery pack of claim 3, wherein each of the first connector, the second connector, and the third connector comprises electrical connections including at least a switch control line for controlling a switch connecting the at least one battery unit to a modular battery unit.

6. The battery pack of claim 5, wherein the modular battery unit comprises one of a controller and a battery unit.

7. The battery pack of claim 5, wherein the cell balancing system balances cell voltage when the switch is on, and does not balance cell voltage when the switch is turned off.

8. The battery pack of claim 1, wherein the cell unit further comprises a protective circuit module for connecting the cells and a battery connector for connecting the cell unit to the cell balancing system.

9. The battery pack of claim 1, wherein the battery pack comprises a plurality of battery units and the cell balancing system is mateably connected to a cell balancing system of a neighboring battery unit.

10. The battery pack of claim 9, wherein each battery unit comprises:
    a first connector for connecting the cell balancing system to a first cell unit;
    a second connector for connecting a first battery unit to a first modular battery unit; and
    a third connector for connecting the first battery unit to a second modular battery unit.

11. The battery pack of claim 10, wherein the first modular battery unit and second modular battery unit comprise one of a controller and a battery unit.

* * * * *